UNITED STATES PATENT OFFICE.

EMERICH SZARVASY, OF BUDAPEST, HUNGARY.

PROCESS TO PRODUCE MIXTURES OF HYDROGEN AND NITROGEN.

1,417,952.     Specification of Letters Patent.     Patented May 30, 1922.

No Drawing.     Application filed February 12, 1915. Serial No. 7,907.

(GRANTED UNDER THE PROVISIONS OF THE ACT OF MARCH 3, 1921, 41 STAT. L., 1313.)

*To all whom it may concern:*

Be it known that I, Dr. EMERICH SZARVASY, a subject of the King of Hungary, residing at Budapest, Hungary, have invented certain new and useful Improvements in a Process to Produce Mixtures of Hydrogen and Nitrogen, of which the following is a specification.

It is well known, that several reactions, e. g., the synthesis of ammonia, require a pure mixture of hydrogen and nitrogen, corresponding, substantially, to the formula $NH_3$. Such mixtures have been obtained hitherto by producing separately the hydrogen, e. g., from water gas or in other suitable manner and the nitrogen, f. i., from combustion gases or the fractioning of atmospheric air, and by mixing the two gases in the desired proportions.

It is further well known, that methane conducted through a glowing tube is decomposed to carbon, hydrogen and slight quantities of solid hydrocarbons.

According to my invention I produce the mixture of hydrogen and nitrogen in obtaining the hydrogen by decomposition of methane but adding the nitrogen to the methane to be decomposed and conducting the nitrogen together with the methane through the decomposing chamber, which contains incandescent carbon proceeding from the decomposition of methane in a previous period of the process.

My experiments have shown, that the decomposition of the methane is accelerated and facilitated by the presence of 25 or more per cent nitrogen diminishing the partial pressure of the methane and further by the fact, that the methane is in contact with the large surface of the carbon fragments filling more or less the reaction chamber and proceeding from former periods of the process.

The reaction produces also more or less cyanogen or cyanic compounds, which can be however easily removed from the gaseous products and are valuable additional products, and enhance the rentability of the process.

To maintain the carbon-filling of the reaction chamber at the decomposition temperature, any suitable heat source may be used; however it is advisable to use for this purpose electric currents conducted through the carbon-filling, this latter acting as heating resistance.

It is useful to move continually or periodically the carbon-filling in order to prevent the caking of the filling and to improve the decomposition.

What I claim is:

A process of producing a mixture of hydrogen and nitrogen, consisting in heating a mixture of nitrogen with methane in a decomposing chamber containing glowing carbon resulting from a previous period of decomposition, said mixture of nitrogen and methane being in proportions that a mixture fit for ammonia-synthesis, viz, corresponding, substantially, to the formula of ammonia, $NH_3$, leaves said decomposing chamber.

In testimony whereof I have affixed my signature in presence of two witnesses.

DR. EMERICH SZARVASY.

Witnesses:
EUGENE KASEMANN,
HUGH KEMENY.